Oct. 13, 1964  J. HENRY-BAUDOT  3,153,165
ELECTRICAL SYNCHRO-MACHINES OF THE AXIAL AIR-GAP TYPE
Filed Oct. 24, 1960  3 Sheets-Sheet 1

United States Patent Office
3,153,165
Patented Oct. 13, 1964

3,153,165
ELECTRICAL SYNCHRO-MACHINES OF THE AXIAL AIR-GAP TYPE
Jacques Henry-Baudot, Antony, Seine, France, assignor to Printed Motors Inc., New York, N.Y.
Filed Oct. 24, 1960, Ser. No. 64,584
Claims priority, application France Oct. 29, 1959
6 Claims. (Cl. 310—268)

The present invention concerns improvements in or relating to electrical synchro-machines, in view of improving both their manufacturing and operative characteristics. The term "synchro-machine" applies to any device of the rotary electrical kind which is specially designed for measurement and transmission of angular positions; such as resolvers, synchro-detectors, synchronous transmitters, angle remote indicators and controllers, and the like.

These synchro-machines all include a wound stator and a wound rotor, the latter being provided with or connected to current collector rings. As the case may be, the stator and/or the rotor windings may or may not have several electrical phases of same or different numbers.

A problem in the design of such synchro-machines lies in the fact that the dispersion of the magnetic flux lines in the air-gap must be as small as possible when passing from the stator to the rotor since the angular accuracy depends on this factor. Another problem lies in the fact that the distribution of the windings or conductors must be thoroughly studied within the iron slots of the structures so that in any geometrical position, the windings are always completely identical from the electrical point of view. Finally, synchro-machines are normally made bipolar, since as the number of poles increases, the manufacturer encounters more difficulties for duly meeting such disadvantages of conventionally designed machines.

An object of the present invention is to partially or wholly remove some or all of the above mentioned disadvantages.

According to the present invention, there is provided a synchro-machine of the axial airgap kind, having at least one winding-bearing stator and one winding-bearing rotor which co-operate through an axial airgap, wherein the stator winding and the rotor winding each made of flat and bare conductors secured to the faces of thin insulating carriers over which they are distributed in two sets of half-turns evenly arranged on said faces and regularly interconnected from face to face to form a number of coils in the winding, a first magnetic plate on which the stator winding is affixed and a second magnetic plate co-operating with that face of the rotor winding opposite to the airgap face of said rotor winding, and current collector rings on the shaft of the rotor connected to taps of said rotor winding.

Such types of windings, which can be obtained through any well-known so-called "printed circuit" technique have been previously described by applicant (see Ser. No. 1,128, filed January 7, 1960, and based on Ser. No. 691,434, filed October 21, 1957, now Patent No. 3,090,880) for improving axial and radial airgap electrical rotating machines and, of course, the advantages intrinsic to such kinds of "printed" windings are fully utilized in the present application. However, in such a synchro-machine according to the invention, further advantages are obtained in that the above-described disadvantages are fully met with their use. A printed winding of the concerned kind completely fulfills the conditions of accuracy and geometrical distribution of the windings, and enables multipolar synchro-machines to be manufactured without any complexity or risk of losing their accuracy. Furthermore the uniform distribution of the bare turns within the airgap increase the efficiency of the machine, since there is no dispersion of the magnetic flux lines in the airgap.

A number of embodiments of the invention will be fully described with reference to the accompanying drawings, wherein.

Figure 4:
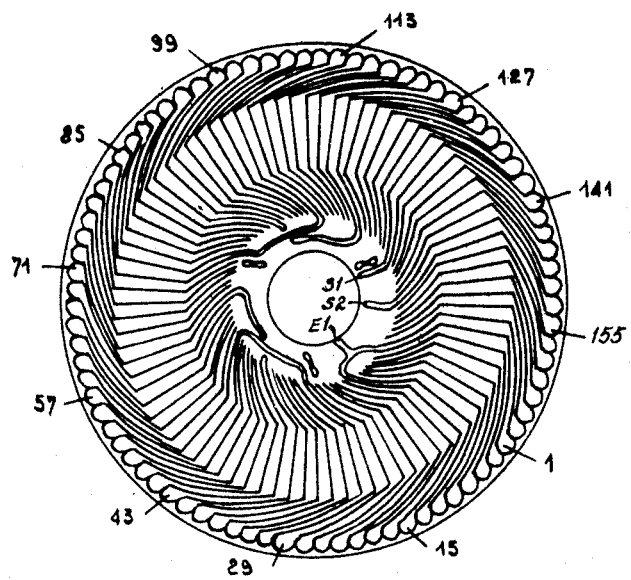
FIGS. 4 and 5 show views of the two faces of a two-phased winding for machines according to the invention.
Figure 5:
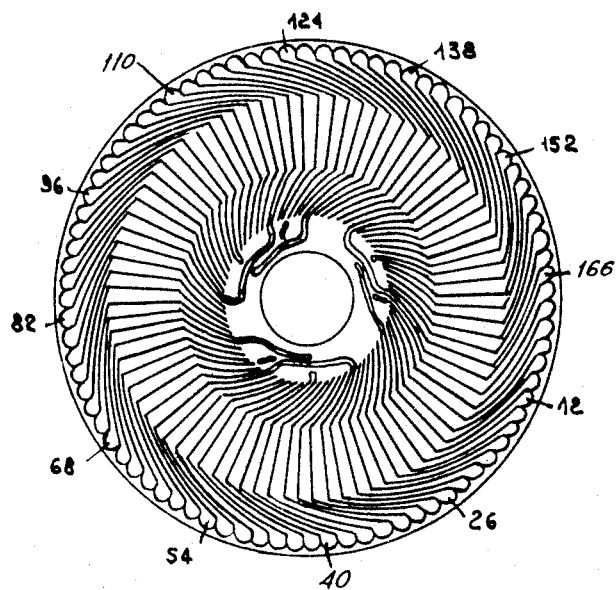
Figure 6:
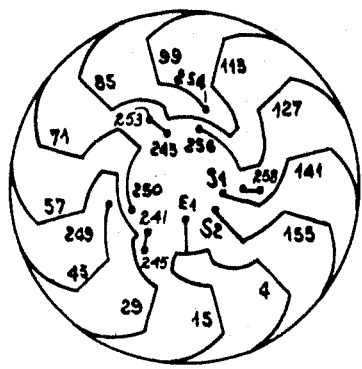
FIGS. 6 and 7 show simplified and schematic representations of the same two-phased winding in order to more clearly define the features of the winding.
Figure 7:
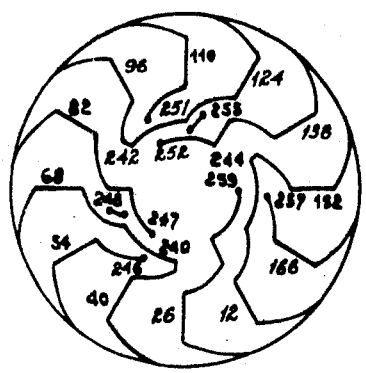

The "printed circuit" embodiments corresponding to the examples of FIGS. 8–9 and 10–11 are not fully illustrated but are obvious from the similar printed-circuit embodiment of FIGS. 6–7 which is fully shown in FIGS. 4 and 5 of the drawings.

Figure 1:
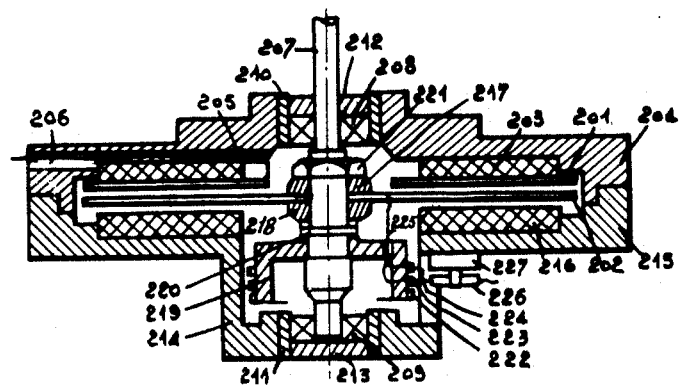
FIG. 1 is a cross-section elevation view of a synchro-machine having a very low inertia rotor.

Referring to FIG. 1, the synchro-machine includes two flat and annular stator and rotor windings 201 and 202 facing each other. The winding 201 is glued to a magnetic ring 203 made of a ferrite and is itself fixed to the half-casing 204. The stator winding 201 is fed by flexible connection leads 205 passing through ducts 206 in the half-casing 204.

The rotor winding 202 is mounted on the shaft 207 journalled in bearings 208 and 209. These bearings are respectively mounted within rings 210 and 211 being themselves held by nuts 212 and 213. The ring 210 is secured to the half-casing 204 and the ring 211 to the part 214 of the other half-casing 215 of the machine. The half-casing 215 carries a magnetic ring 216 made of the same material as the ring member 203. The rotor winding 202 is situated between the winding 201 carried by the magnetic ring 203 and the magnetic ring 216.

The hub of the rotor is made in two parts 217 and 218 which securely hold the winding member 202 therebetween by means of its central portion which carries no winding. The hub part 218 bears against the flange of a cup 219 pinned or keyed to the shaft at 220. The hub part 217 is secured by a nut 221. The cup 219 on its outer cylindrical surface carries three current collector rings 222, 223 and 224. Each collector ring is connected by a flexible lead 225 to a tap on the rotor winding 202. A slider 226, which is carried by a terminal-post 227 secured to the half-casing 215, co-operates with one collector ring and similar sliders are provided for the other collector rings.

According to the type of winding (i.e., single phase, two phase or three phase), two or three of the collector rings are used and as many sliders are provided to co-operate with the number of rings in use.

Figure 2:
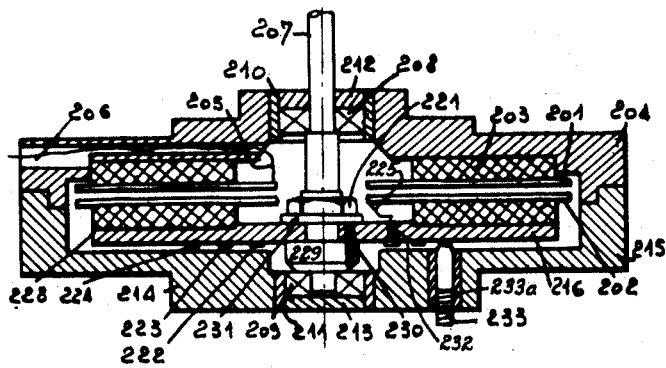
FIG. 2 is a cross-section of a modification of the machine of FIG. 1 wherein the rotor has a larger inertia.

In the embodiment shown in FIG. 1, the rotor is constituted solely by the rotor winding unit of the machine and consequently the rotor has a low inertia, on the other hand, in some cases it is found desirable to have a construction where the magnetic ring 216 forms part of the rotor of the machine to which the rotor winding unit is secured as shown in the arrangement of FIG. 2. This arrangement is advantageous from the ponit of view of the magnetic flux since one airgap is thus eliminated. In such a case, the magnetic ring 216 which supports the winding 202 is secured to a plate 228 and it is this plate which in turn is secured to the shaft 207 by a pin 230 on a flange 229 of the shaft 207. The rotor parts are held in position by a nut 221 which presses a washer 231 against the plate 228. The plate 228 carries the collector rings 222 to 224, the flexible leads or taps 225 from the rotor winding passing through ducts 232 within the plate. Brushes 233 mounted in insulating sleeves 233a slide on rings 222, 223 and 224.

Figure 3:
FIG. 3 is a cross-section of a synchro-machine winding.

FIG. 3 shows a cross-section of any winding in the synchro-machine. For the sake of clarity the thickness of the winding has been exaggerated with respect to the other dimensions. Such a winding comprises carrier insulating ring 234, the material of which may be either dielectric or magnetic provided it is still insulating. Thin conductive coatings 235 and 236 are applied over the opposite insulating faces of the carrier ring 234. These conductive coatings have been shaped according to any known method, such as mechanical cutting, photo-etching, etc. into two winding halves, i.e. on either face of the carrier 234 there exists a complete set of half-turn conductors which are joined at their ends to form an electrical winding pattern, preferably of the lap kind. The shapes of the half-turn conductors are such that the winding can be completed by establishing face-to-face connections between the ends of the half-turn conductors. The face-to-face connections are indicated at 237 and 238 in FIG. 3. The face-to-face interconnections thus complete the winding and form a number of coils or spools. The electrical coils formed by these windings are of a complicated nature and will now be explained in greater detail with reference to examples relating to two-phase, three-phase and single-phase windings of the remaining figures in the drawings.

As has been previously mentioned, the number of phases per winding in a synchro-machine can be varied. In preferred forms the stator winding will generally be either two- or three-phased and the rotor winding can either also be two or three-phased or it can be single-phased. As in conventional machines, the rotor of a synchro-machine can be made two-phased and merely used as a single phase one by disconnection of one of its two phases.

In the examples illustrated in FIGS. 4 to 11, it is to be understood that the input, output and connection leads or taps between the coils of the windings are obtained by mere printed extensions of the concerned conductors of the windings. Although these input, output and interconnections are shown at the inner peripherical portion of the winding members, they could equally well be provided at the outer peripherical portion.

FIGS. 4 to 7 relate to a two-phase winding having 84 turns and consequently 84 half-turn conductors on each face of the carrier disc, and 14 turns per pole in each phase. This winding is then made of six identical coils connected in series. In each coil the front or forward pitch of the winding is 27 and the back pitch is 25. The conductors are numbered by even numbers on one face, FIGS. 5 and 7, and by odd numbers on the other face, FIGS. 4 and 6. From the above definition of the pitches is given the shape of any half-turn conductor which comprises a median portion which is substantially radial and sector-shaped with two end portions which are slanted, and even curved in view of maintaining a substantially uniform width at any diameter of the winding for said conductors. These end portions end in larger parts or terminals for the face-to-face connections by means of rivets or hole metallizations passing through the carrier disc.

Input E1 is common to the two phases (FIGS. 4 and 6), as it is connected to conductors numbered 1 and 15. For the first phase, conductor 1 is connected to conductor 28 of the other face, from which the winding returns back to conductor 3 on the first face, and so forth until conductor 40 is reached. From 40 and by means of a straight connection 240 (FIG. 7), the winding jumps to conductor reaches conductor 66 which returns to conductor 39 and so forth until conductor 29 is reached. From the inner end of conductor 29, a straight connection 241 (FIG. 6), leads to conductor 57 from which, on the other face, the winding goes to conductor 84 from which it comes back to conductor 59 which is connected to conductor 86 and so forth until conductor 96 is reached. From the inner end of conductor 96 through a straight connection 242 (FIG. 7), to conductor 124 which initiates a further coil from 124 to 97, 122 and so forth up to 85. From 85 through connection 243 (FIG. 6) begins a further coil including conductor 113 to 140 to 115 and so forth up to conductor 152. From the inner end of conductor 152 through 244 (FIG. 7) the sixth coil begins and extends through 12, 153, 10 etc., up to conductor 141 connected to output S1.

The second phase starts from input E1 and conductor 15 which leads to conductor 42 which closes the turn on conductor 17 and so forth for the first coil which ends with conductor 54. This conductor 54 is connected to conductor 82 by a connection passing through a jumper 245 (FIG. 6) connecting the through-leads 246 and 247 (FIG. 7) of the inner ends of conductors 54 and 82. The second coil extends from 82 to 55 to 80, etc., and ends on conductor 43. The through connection 249 of conductor 43 is connected to the through-connection 250 of conductor 71 by a jumper segment 248 (FIG. 7). The third coil starts from 71 to 98 to 73, etc. up to the inner end of 110. Conductor 110 by its through-connection 251, conductive segment 253 (FIG. 6), and the through-connection of conductor 138 at 252 starts the fourth coil which includes said conductor 138 to 111, 136, up to conductor 99. From conductor 99, through its through-connection 254, conductive segment 255 (FIG. 7) and through-connection 256 of conductor 127 is reached the following spool which from 127 to 154 reaches conductor 166. The end through-connection of 166 and conductive segment 258 reaches the end through-connection of conductor 26 from which it passes through 167, 24 and finally reaches conductor 155 connected to the output S2 of the second phase (FIG. 6).

When such a two-phase winding is used as a single phase winding, one of the outputs is merely left unconnected to an external circuit.

Figure 8:
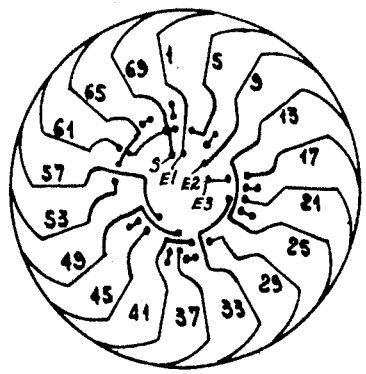
FIG. 8 and 9 show schematic representations of a three-phase winding for synchro-machines according to the invention.
Figure 9:
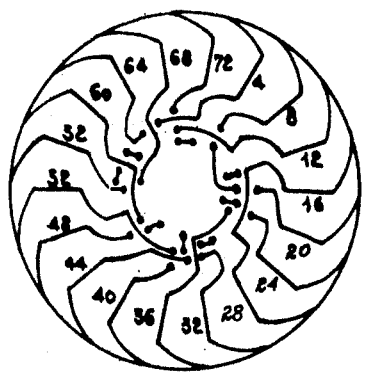

As the two-phase winding example has just been fully described, the three-phase winding shown in FIGS. 8 and 9 can be summarized as follows:

The winding shown in FIGS. 8 and 9 relates to a three-phase, six pole winding having 36 turns and 36 conductors per face. There are 12 conductors per phase and face, 2 conductors per pole, per phase and per face. The first phase starts from input E1 at the inner end of conductor 1 and ends at output S connected to the inner end of conductor 61 and includes six coils defined by the connections between conductors 16–28, 13–25, 40–52, 37–49 and 66–4. The second phase starts from input E2 connected to the inner end of conductor 9 and ends at output S which is connected to the inner end of conductor 69 and includes the six coils defined by the connections between conductors 24–36, 21–33, 48–60, 45–57 and 72–12. The third phase starts from input E3 connected to the inner end of conductor 17 and ends at the common output S connected to the inner end of conductor 5 and includes the six coils defined by the connections between conductors 32–44, 29–41, 56–68, 53–65 and 8–20.

Figure 10:
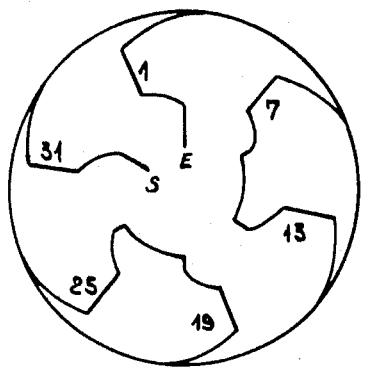
FIGS. 10 and 11 show similar schematic representations of a single phase winding for synchro-machines according to the invention.
Figure 11:
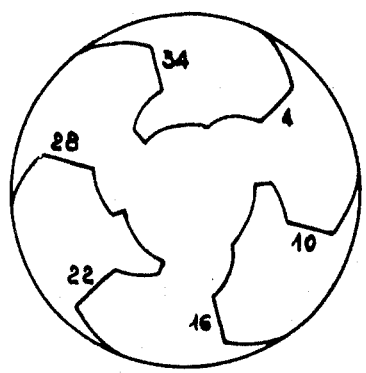

The diagrams of FIGS. 10 and 11 depict a single phase winding of 24 conductors, 12 per face, six poles and wound with two-third coverage. The six sections or coils are defined by the connections between conductors 10–16, 7–13, 22–28, 19–25 and 43–4 between input E at the inner end of conductor 1 and output S at the inner end of conductor 31.

It will be understood that the rotor and stator windings are identical, that is, they have the same number of halfthe same number of turns, and the same turn-span in each winding.

In the appended claims the term "magnetic yoke plate" refers to a yoke member whch is magnetically soft and is not permanently magnetized.

What is claimed is:

1. An electric synchro-machine of the axial airgap type, comprising an annular stator member and an annular rotor member arranged in parallel coaxial relation and axially spaced apart to form an annular airgap therebetween, each of said members embodying a flat annular winding unit, each winding unit comprising a thin carrier disc having annular insulating surfaces on opposite faces thereof and supporting an annular winding, each annular winding being formed of two sets of flat and bare half-turn conductors intimately adhering to the annular insulating surfaces on opposite faces of said carrier disc, extending transversely across said annular surfaces and being evenly distributed throughout said annular surfaces, the number of conductors and their distribution being the same on each carrier disc, said half-turn conductors being interconnected from one face of said disc to the other to form a winding having pole-producing coils distributed about said annular surfaces, the coils in the two windings being the same in number and formation, said stator member also comprising a first magnetic yoke plate on which the stator winding unit is affixed and forming a continuous annular magnetic yoke for said stator winding, a second magnetic yoke plate cooperating with that face of the rotor winding opposite to the airgap face of said rotor winding unit and forming a continuous annular magnetic yoke for said rotor winding, and current collector rings carried on the rotor and connected to taps of said rotor winding.

2. A synchro-machine according to claim 1 wherein the coils in one of said winding units are arranged to form a multi-phase winding.

3. A synchro-machine according to claim 2, wherein each of the windings is of the lap type and the interconnections between the coils in each phase of the winding are also made of flat conductors secured to the same insulating carrier as the winding conductors of which they constitute direct extensions.

4. A synchro-machine according to claim 1, wherein the second magnetic plate which co-operates with said rotor winding is fixed and spaced from said rotor winding unit by an airgap of substantially the same size as that between the stator and rotor winding units.

5. A synchro-machine according to claim 1, wherein the second magnetic plate which co-operates with the rotor winding is fixed to said rotor winding unit and forms part of said rotor.

6. An electric machine according to claim 1 wherein two half-turn conductors on one face of a winding unit which half-turn conductors are spaced apart by at least one intervening half-turn conductor, have their adjacent ends connected together by through connections from their adjacent ends to the opposite face of the carrier disc, and said through connections are bridged by a conductive segment adhering to the opposite face of said disc.

References Cited in the file of this patent
UNITED STATES PATENTS

| | | |
|---|---|---|
| 534,953 | Eickemeyer | Feb. 26, 1895 |
| 2,773,239 | Parker | Dec. 4, 1956 |
| 2,847,589 | Haydon | Aug. 12, 1958 |
| 2,970,238 | Swiggett | Jan. 31, 1961 |
| 3,054,011 | Silverschotz et al. | Sept. 11, 1962 |